Jan. 11, 1927.
M. W. OTTO
RAKE
Filed April 27, 1926
1,614,385
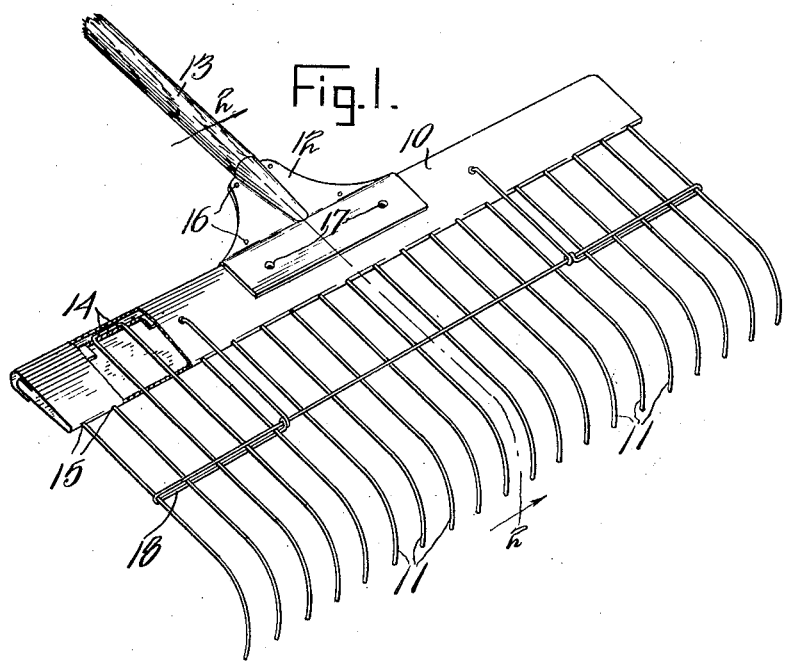
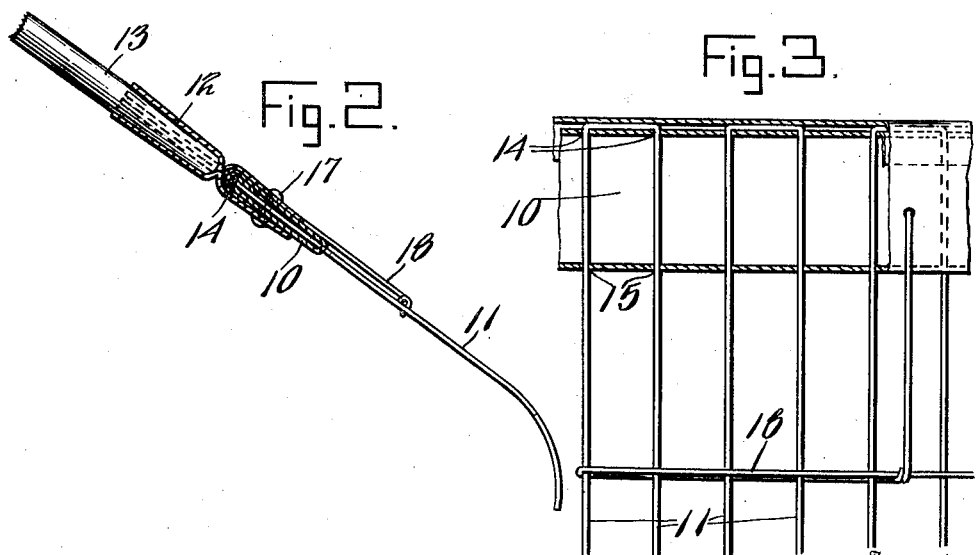
Inventor
Miller W. Otto.
By
Attorney Patented Jan. 11, 1927.

1,614,385

UNITED STATES PATENT OFFICE.

MILLER W. OTTO, OF AURORA, ILLINOIS, ASSIGNOR TO THE LARIMER COMPANY, OF AURORA, ILLINOIS, A CORPORATION OF ILLINOIS.

RAKE.

Application filed April 27, 1926. Serial No. 105,003.

My said invention relates to improvements in lawn rakes and it is an object of the invention to provide a rake of neat appearance, light weight and durable and flexible construction whereby various advantages are secured all as will be more fully described and claimed.

Referring to the accompanying drawings which are made a part hereof and on which similar reference characters indicate similar parts, Figure 1 is a perspective of a lawn rake constructed in accordance with my invention, Figure 2, a section on line 2—2 of Figure 1, and Figure 3, a detail section partly broken away.

In the drawings reference character 10 indicates a rake body in which are mounted a plurality of flexible teeth or tines 11, said body having secured thereto a pair of opposed plates 12 provided with a socket for reception of a handle 13.

The body 10 is formed of a rectangular strip preferably of sheet steel or the like having a longitudinally arranged row of spaced perforations 14 and a second similar row of spaced perforations 15 in parallel spaced relation to the first row, one of said rows being near the edge of the strip and the other of said rows spaced substantially longitudinally along the center thereof. The perforations in each row are spaced a uniform distance apart and in corresponding relation to permit the teeth or tines to extend directly therethrough and the wider imperforate portion of the strip is bent over to secure the tines in the rake body.

The tines are preferably constructed of spring steel of looped head or U-shaped design, each pair of tines being of substantially U-shape and the bight or connection between the tines rests upon the bent-over portion of the body and prevents their being loosened in operation. The rake teeth or tines are fastened in the rake body under heavy pressure and are thus held immovable therein.

The rectangular blank which forms a holder for the tines is bent longitudinally along each row of perforations and the points of the tines are first inserted through the perforations adjacent the edge of the blank and then through the other perforations and the imperforate portion of the blank is folded around the loop portion of the tines and is stamped under heavy pressure to securely lock the tines in position.

A pair of opposed plates 12 of substantially triangular shape is provided, said plates being longitudinally embossed along one edge and a central semi-circular tapered recess is also embossed in each plate to form a socket for the handle circular in cross section. These plates are riveted at two places on each side of the handle at 16. One of the rivets on each side of the handle is close to the outer edge while the inner rivet is close to the body 10 of the rake. Other appropriate securing means may, of course, be substituted for the rivets, if preferred. Rivets or bolts 17 are utilized for firmly securing said plates to the body 10.

It is very desirable to provide some means of reenforcing or bracing the rake teeth or tines and I therefore provide a brace 18 for equalizing the individual operation and for reenforcing them individually and collectively. The brace 18 extends along one side of the tines substantially midway thereof and curves rearwardly around the same and is twisted around the body of the brace into parallel relation to the teeth and is clamped in the body of the rake.

A rake is therefore provided which may be used substantially in the same manner as a broom on account of the flexible nature of the tines and obviously it will very rarely become clogged with refuse, however, whenever such a condition occurs a backward sweep will clean the rake and it will not be necessary to touch the tines with the hand. Obviously a rake of this character may be used much more readily and with less exertion than a rake of the ordinary kind and with less injury to lawns and shrubbery. At the time recesses which are inaccessible to the ordinary rake may be readily reached as well as small spaces around roots, stems of shrubbery, hedges, trunks of small trees and other similar obstacles with a scratching of the ground which is very desirable to promote healthy and luxuriant plant growth. The action of the tines is firm, and curved and reenforced as they are they insert themselves searchingly among the vegetation and sift forth the dead grass, sticks, stones and other refuse as the rake is wielded with an easy sweeping motion.

It will be obvious to those skilled in the art various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. A rake comprising a body provided with two rows of spaced perforations said body being bent along each row of perforations and having its ends overlapping, U-shaped tines extending through said perforations and with an imperforate end portion of said body bent over the bight of said tines, substantially as set forth.

2. A rake comprising a body, flexible tines supported by said body, and a brace for said tines extending along one side of the same and bent reversely at its ends and around itself and secured within said body, substantially as set forth.

3. A rake comprising a body having overlapping ends, and looped tines mounted in said body with the loops of said tines lying between said overlapping ends, substantially as set forth.

4. A rake comprising a body having overlapping ends, and tines mounted in said body said tines having lateral portions lying between said overlapping ends, substantially as set forth.

5. A rake comprising a body having overlapping ends, and looped tines mounted in said body with loops of said tines lying between said overlapping ends said tines extending through the intermediate portion of said body remote from said overlapping ends, substantially as set forth.

6. A rake comprising a body having overlapping ends, and tines mounted in said body and extending through the intermediate portion of the body remote from the overlapping ends, said tines having laterally extending portions disposed between said overlapping ends whereby they are secured in position, substantially as set forth.

In witness whereof, I have hereunto set my hand at Aurora, Illinois, this 23rd day of April, A. D. nineteen hundred and twenty-six.

MILLER W. OTTO.